UNITED STATES PATENT OFFICE.

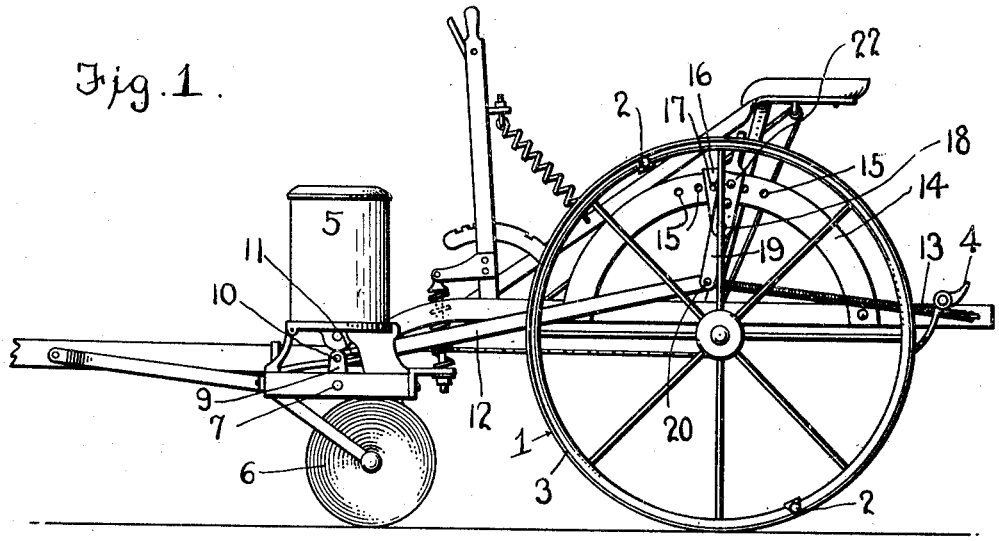
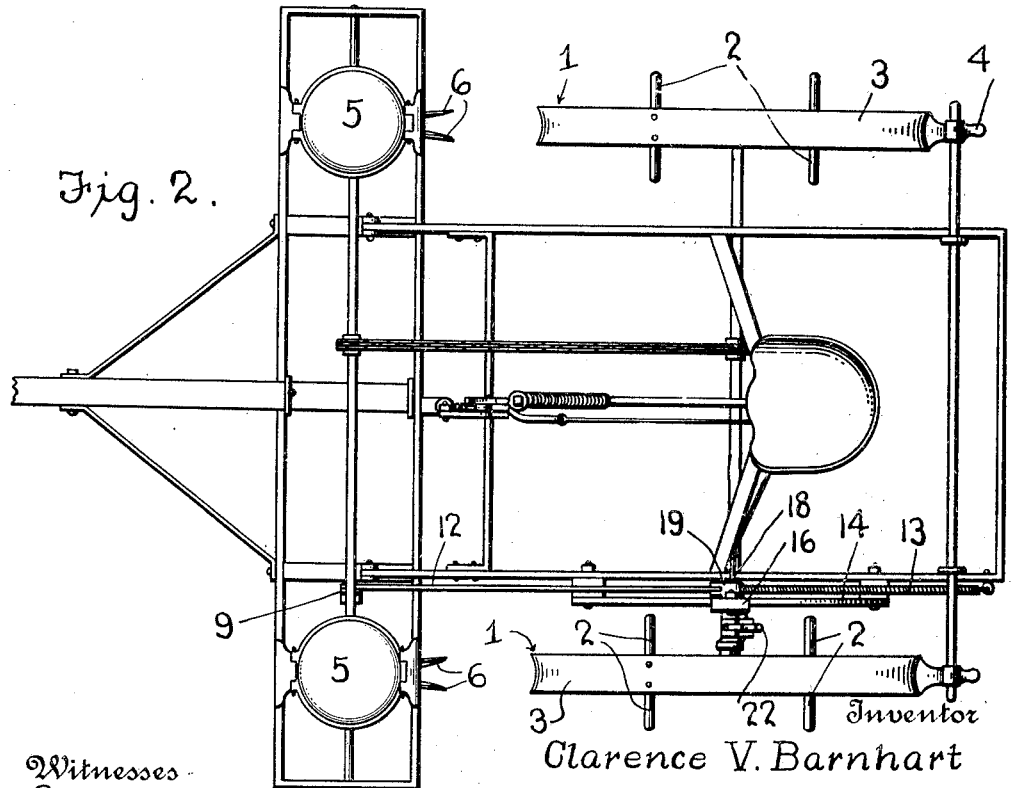

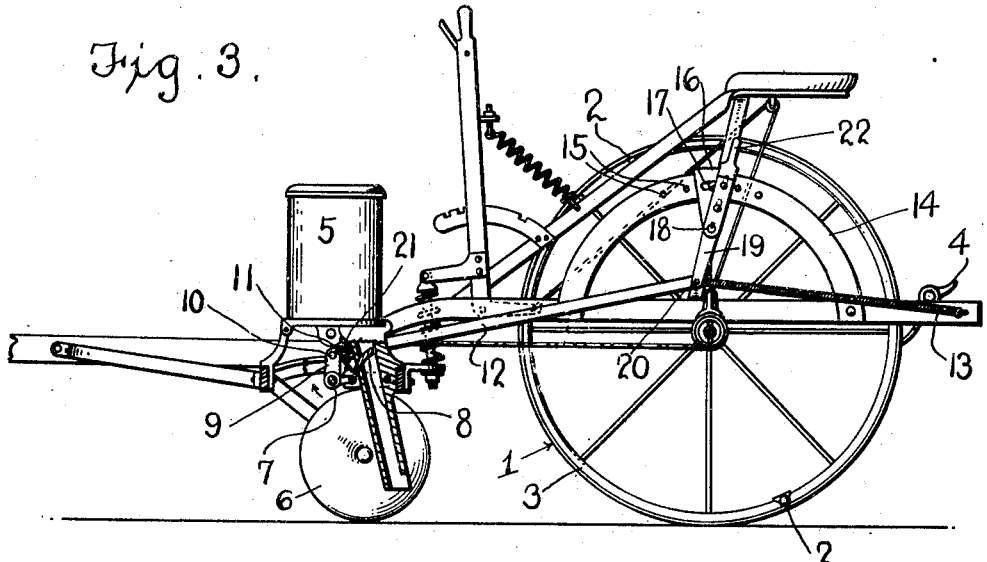
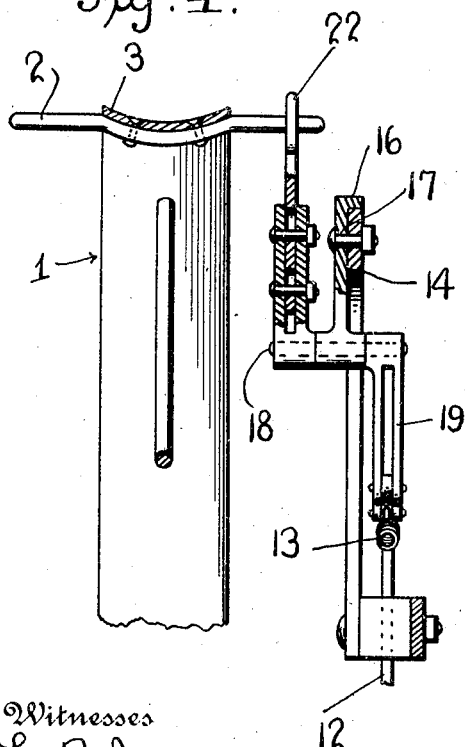

CLARENCE V. BARNHART, OF WAYNESBORO, PENNSYLVANIA, ASSIGNOR, TO JOSEPH K. HOFFMAN AND WARREN M. BAECHTEL, BOTH OF HAGERSTOWN, MARYLAND.

SEED-PLANTER.

1,357,438.     Specification of Letters Patent.     Patented Nov. 2, 1920.

Application filed December 28, 1918. Serial No. 268,645.

*To all whom it may concern:*

Be it known that I, CLARENCE V. BARNHART, a citizen of the United States, residing at Waynesboro, in the county of Franklin and State of Pennsylvania, have invented new and useful Improvements in Seed-Planters, of which the following is a specification.

My present invention pertains to wheeled planters, and consists in providing marking arms on one or both of the ground wheels, and utilizing the marking arms complementary to one of said wheels as tappets to actuate the seed-dropping mechanism, in the peculiar and advantageous tappet-actuated, seed-dropping mechanism, as hereinafter described and definitely claimed.

In the accompanying drawings, hereby made a part hereof:

Figure 1 is a side elevation of a seed planter equipped with the best practical embodiment of my invention that I have as yet devised.

Fig. 2 is a plan of the same.

Fig. 3 is a longitudinal vertical section showing the seed-dropping mechanism.

Fig. 4 is an enlarged detail transverse section, taken through the rim of one wheel and showing the relation of one marking arm and tappet thereto.

Similar numerals of reference designate corresponding parts in all of the views of the drawings.

In carrying my invention into effect, I provide one or both, preferably both, of the ground wheels 1 of the planter with marking arms 2; the said arms 2 being fixed to the inner sides of the rims 3 of the wheels so as not to interfere with the functioning of the ordinary scrapers 4, and being extended laterally at right angles to the opposite edges of the rim. The arms 2 are designed to make marks in the ground at right angles to the traverse of the planter to indicate the location of the seed dropped. This is advantageous, inasmuch as it affords a starting point for planting a reverse row in conformity with the finishing point of the preceding row. It also enables the operator to start a reverse row at any point in the length of the preceding row, care being taken to so position the marker arms that the indentations in the ground will be either coincident with the hills of corn or centrally between the hills, with the result that when the planter is moved first in one direction and then in parallelism in the opposite direction adequate accurate checking is brought about without the employment of any means whatever extraneous to the planter. When both of the ground wheels are equipped with the marking arms 2, as before indicated, the arms on one wheel will be transversely alined with those on the other wheel. 5, 5 are the seed hoppers of the planter, and 6, 6 are the shoes or disks of the planter; these elements being preferably of the ordinary well known construction, and the shoes or disks 6 being mounted in the conventional manner so as to permit of the same being raised or lowered uniformly through the ordinary well known means provided for that purpose.

Extending transversely of the machine and below the hoppers 5 is the ordinary rock shaft 7 on which are valve portions 8 adapted to normally prevent the passage of seed from the discharge orifices of the hoppers, and also adapted when the shaft 7 is rocked in the direction indicated by the arrow to establish communication between the discharge orifices of the hoppers 5 and the pendent spouts, Figs. 3, so as to enable seed to pass from the hoppers to the ground. On the end of the shaft 7, preferably at the left-hand side of the planter, is an arm 9, equipped with a lateral pin 10. Said pin 10 is disposed in a longitudinal slot 11 in a rearwardly extending pitman 12, this provision being made in order to prevent operation of the shaft 7 incidental to backward movement of the planter, as will presently appear. Interposed between and connected to the rear end of the pitman 12 and the rear portion of the planter frame is a retractile spring 13. Fixed with respect to the left-hand side of the planter frame and spaced from said frame and located between the same and the adjacent ground wheel 1 is a segmental supporting bar 14, having by preference and for adjustment purposes a plurality of transverse apertures 15, and bolted or otherwise fixedly connected to the said supporting bar 14 is a bracket 16. This bracket 16 is preferably provided with a slot 17 for close adjustment purposes. Journaled in the bracket 16 is a transverse spindle 18, and fixedly connected to said spindle is a depending arm 19, pivotally connected at 20 to the rear portion of the pitman. By virtue of this construction, it will be manifest that when the arm 19 is swung and the pitman 12 is moved rearwardly, the shaft 7 will be rocked against the action of the usual spring or springs 21 to bring about discharge of seed from the hoppers. Also fixed on the spindle 18 and spaced from the arm 19 is an upstanding rocker arm 22, which is adjustable as to length with a view to assuring the proper throw when the said arm 22 is engaged and moved by one of the tappet arms 2. Manifestly, when the arm 22 is moved forwardly, the arm 19 is thrown rearwardly for the purpose before indicated. At this point, I would have it understood that the spring 13 tends to pull rearwardly on the pitman 12 to hold said pitman firmly in engagement with the pin on the crank arm of the shaft 7.

It will be readily appreciated from the foregoing that by virtue of my invention the arms 2 are made to serve the two-fold function of marking the ground and actuating the seed-dropping mechanism at the proper intervals; it being understood that in the preferred embodiment of my invention the coöperating elements are so arranged as to bring about the dropping of the seed centrally between the marks.

I have entered into a detailed description of the construction and relative arrangement of the parts comprised in the present and preferred embodiment of my invention, in order to impart a full, clear and exact understanding of the said embodiment. I would have it understood, however, that I do not desire to be restricted to the specific construction and relative arrangement of parts since in the future practice of the invention various changes in the form and relation of the elements may be made, without involving departure from the scope of my invention as defined by my appended claims.

Having described my invention, what I claim and desire to secure by Letters Patent is:

1. The combination in a planter, of a main frame, a ground wheel, tappet means carried by the ground wheel, a hopper having a discharge orifice, means yieldingly held in closed position for normally closing said orifice; said means comprising a rocking element and an arm on said element and equipped with a lateral pin, and means actuatable by the tappet means and including a rearwardly extending pitman having a slot receiving the pin on said arm, a retractile spring interposed between the rear portion of said pitman and the rear portion of the frame, a segmental supporting bar on the frame, a bracket carried by said bar, a spindle journaled in said bracket and having a depending arm pivotally connected to the rear portion of the pitman, and an upstanding arm fixed on the spindle and adapted to be engaged by said tappet means, the pitman, the depending arm on the spindle and the retractile spring being relatively arranged to enable the latter to yieldingly retain said connected elements in an idle state.

2. The combination in a planter, of a frame, a seed hopper having a discharge passage, a rock shaft having a valve portion controlling the discharge passage of the hopper and also having an arm, means for normally retaining said valve portion in closed position, a ground wheel, combined marking and tappet arms on said wheel, an arm pivotally supported on the main frame and arranged to be moved forwardly by the arms on the ground wheel, a connection intermediate said arm and the arm on the rock shaft, and a retractile spring connected with the tappet arm and the frame and adapted to restore the parts to their normal positions subsequent to an operation by one arm on the ground wheel.

In testimony whereof I have affixed my signature.

CLARENCE V. BARNHART.